United States Patent
Schweissinger et al.

(10) Patent No.: US 11,603,425 B2
(45) Date of Patent: Mar. 14, 2023

(54) HYDROGENATED LINEAR POLYDIENE COPOLYMERS AS BASE STOCK OR LUBRICANT ADDITIVES FOR LUBRICANT COMPOSITIONS

(71) Applicant: Evonik Operations GmbH, Essen (DE)

(72) Inventors: Emily Clare Schweissinger, Dortmund (DE); Yvonne Gross-Onnebrink, Raesfeld (DE); Holger Pletsch, Frankfurt (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/307,006

(22) Filed: May 4, 2021

(65) Prior Publication Data

US 2021/0347927 A1 Nov. 11, 2021

(30) Foreign Application Priority Data

May 5, 2020 (EP) .................................. 20172862

(51) Int. Cl.
*C08F 236/08* (2006.01)
*C10M 143/12* (2006.01)
*C10M 145/14* (2006.01)
*C10M 169/04* (2006.01)

(52) U.S. Cl.
CPC ......... *C08F 236/08* (2013.01); *C10M 143/12* (2013.01); *C10M 145/14* (2013.01); *C10M 169/041* (2013.01); *C08F 2810/00* (2013.01); *C10M 2203/003* (2013.01); *C10M 2205/06* (2013.01); *C10M 2209/084* (2013.01)

(58) Field of Classification Search
CPC .............. C10M 143/12; C10M 145/14; C10M 169/041; C10M 2203/003; C10M 2205/06; C10M 2209/084; C08F 236/08; C08F 2810/00
See application file for complete search history.

(56) References Cited

U.S. PATENT DOCUMENTS

| | | | |
|---|---|---|---|
| 3,541,064 A | 11/1970 | Yoshimoto et al. | |
| 3,795,615 A | 3/1974 | Pappas et al. | |
| 4,316,973 A | 2/1982 | Kennedy | |
| 4,533,482 A | 8/1985 | Bollinger | |
| 4,656,219 A | 4/1987 | Oyama et al. | |
| 4,859,210 A | 8/1989 | Franz et al. | |
| 5,272,211 A | 12/1993 | Sutherland et al. | |
| 5,312,884 A | 5/1994 | Gore et al. | |
| 5,834,408 A | 11/1998 | Mishra et al. | |
| 6,008,164 A | 12/1999 | Aldrich et al. | |
| 6,059,955 A | 5/2000 | Cody et al. | |
| 6,071,980 A | 6/2000 | Guan et al. | |
| 6,090,989 A | 7/2000 | Trewella et al. | |
| 6,103,099 A | 8/2000 | Wittenbrink et al. | |
| 6,184,307 B1* | 2/2001 | Schisla | C08L 53/005 525/333.1 |
| 6,310,149 B1 | 10/2001 | Haddleton | |
| 6,332,974 B1 | 12/2001 | Wittenbrink et al. | |
| 6,350,723 B1 | 2/2002 | Mishra et al. | |
| 6,420,618 B1 | 7/2002 | Berlowitz et al. | |
| 6,475,960 B1 | 11/2002 | Berlowitz et al. | |
| 6,506,297 B1 | 1/2003 | Wittenbrink et al. | |
| 6,599,864 B1 | 7/2003 | Bertomeu | |
| 6,610,636 B2 | 8/2003 | Berlowitz et al. | |
| 6,624,263 B2 | 9/2003 | Matyjaszewski et al. | |
| 6,841,695 B2 | 1/2005 | Bollinger et al. | |
| 7,067,049 B1 | 6/2006 | Baillargeon et al. | |
| 7,163,913 B2* | 1/2007 | Briggs | C10M 143/16 508/591 |
| 7,572,874 B2 | 8/2009 | Matyjaszewski et al. | |
| 7,714,075 B1 | 5/2010 | Le et al. | |
| 2001/0025078 A1 | 9/2001 | Mayer et al. | |
| 2004/0167269 A1 | 8/2004 | Lau et al. | |
| 2005/0250880 A1 | 11/2005 | Troy et al. | |
| 2008/0194443 A1 | 8/2008 | Stohr et al. | |

(Continued)

FOREIGN PATENT DOCUMENTS

| | | |
|---|---|---|
| EP | 0 471 266 | 2/1992 |
| EP | 0 566 048 | 10/1993 |

(Continued)

OTHER PUBLICATIONS

Anonymous: "Lösungspolymerisation—Römpp, Thieme," Aug. 31, 2008, XP055650313, retrieved from the internet: URL:https://roempp.thieme.de/roempp4.0/do/data/RD-12-01491; (retrieved on Dec. 12, 2019); submitted with English language machine translation.
European Search Report and Search Opinion for corresponding application EP 20 17 2862, filed May 5, 2020.
International Search Report for PCT/EP2019/078857 filed Oct. 23, 2019; corresponding to copending U.S. Appl. No. 17/292,451.
Written Opinion of the International Searching Authority for PCT/EP2019/078857 filed Oct. 23, 2019; corresponding to copending U.S. Appl. No. 17/292,451.

(Continued)

*Primary Examiner* — Cephia D Toomer

(74) *Attorney, Agent, or Firm* — Law Office of: Michael A. Sanzo, LLC

(57) ABSTRACT

The present invention relates to hydrogenated linear copolymers comprising butadiene and isoprene monomer units, as well as the process for preparing these copolymers. The invention further relates to a lubricating oil composition comprising one or more hydrogenated linear copolymers according to the invention, as well as to the use of the aforementioned copolymers as a lubricant additive or a synthetic base fluid for lubricant compositions, especially in gear oils, transmission oils, hydraulic oils, engine oils, grease, marine oils or industrial lubricating oils.

12 Claims, No Drawings

(56) References Cited

U.S. PATENT DOCUMENTS

| | | |
|---|---|---|
| 2011/0230378 A1 | 9/2011 | Schimmel et al. |
| 2012/0053100 A1 | 3/2012 | Radano et al. |
| 2013/0229016 A1 | 9/2013 | Ghahary et al. |
| 2014/0011724 A1 | 1/2014 | Onumata et al. |
| 2015/0275130 A1 | 10/2015 | Willars et al. |
| 2017/0306259 A1 | 10/2017 | Ding et al. |
| 2018/0327687 A1 | 11/2018 | Kwak |
| 2019/0169521 A1 | 6/2019 | Zhang et al. |
| 2020/0347316 A1 | 11/2020 | Yamamoto et al. |
| 2022/0017654 A1 | 1/2022 | Pletsch et al. |
| 2022/0017835 A1 | 1/2022 | Pletsch et al. |

FOREIGN PATENT DOCUMENTS

| | | |
|---|---|---|
| EP | 0 668 342 | 8/1995 |
| EP | 0 776 959 | 6/1997 |
| EP | 3 378 877 | 9/2018 |
| FR | 2 289 597 | 5/1976 |
| GB | 1 030 306 | 5/1966 |
| GB | 1 112 749 | 5/1968 |
| GB | 1 165 286 | 9/1969 |
| GB | 2 270 317 | 3/1994 |
| JP | 2015/143346 | 8/2015 |
| WO | WO 98/40415 | 9/1998 |

OTHER PUBLICATIONS

International Preliminary Report on Patentability for PCT/EP2019/078857 filed Oct. 23, 2019; corresponding to copending U.S. Appl. No. 17/292,451.
International Search Report for PCT/EP2019/078865 filed Oct. 23, 2019; corresponding to copending U.S. Appl. No. 17/292,452.
Written Opinion of the International Searching Authority for PCT/EP2019/078865 filed Oct. 23, 2019; corresponding to copending U.S. Appl. No. 17/292,452.
International Preliminary Report on Patentability for PCT/EP2019/078865 filed Oct. 23, 2019; corresponding to copending U.S. Appl. No. 17/292,452.
Appendix E-API Oil Interchangeability Guidelines for Passenger Car Motor Oils and Diesel Engine Oils, section 1.3 "Base Stock Categories" (Apr. 2008).
Wang, et al., "Controlled/'Living' Radical Polymerization. Atom Transfer Radical Polymerization in the Presence of Transition-Metal Complexes," *J. Am. Chem. Soc.* 117:5614-5615 (1995).
Wang, et al., "Controlled/'Living' Radical Polymerization. Halogen Atom Transfer Radical Polymerization Promoted by a Cu(I)Cu(II) Redox Process," *Macromolecules* 28:7901-7910 (1995).
U.S. Appl. No. 17/292,451, filed May 10, 2021, Pletsch.
U.S. Appl. No. 17/292,452, filed May 10, 2021, Pletsch.

* cited by examiner

HYDROGENATED LINEAR POLYDIENE COPOLYMERS AS BASE STOCK OR LUBRICANT ADDITIVES FOR LUBRICANT COMPOSITIONS

CROSS REFERENCE TO RELATED APPLICATIONS

The present application claims priority under 35 USC § 119 to application EP 20172862.3, filed in Europe on May 5, 2020, the contents of which is incorporated herein by reference in its entirety.

TECHNICAL FIELD OF THE INVENTION

The present invention relates to hydrogenated linear copolymers comprising butadiene and isoprene monomer units, as well as the process for preparing these copolymers. The invention further relates to a lubricating oil composition comprising one or more hydrogenated linear copolymers according to the invention, as well as to the use of the aforementioned copolymers as a lubricant additive or a synthetic base fluid for lubricant compositions, especially in gear oils, transmission oils, hydraulic oils, engine oils, grease, marine oils or industrial lubricating oils.

BACKGROUND OF THE INVENTION

The present invention relates to the field of lubrication. Lubricants are compositions that reduce friction between surfaces. In addition to allowing freedom of motion between two surfaces and reducing mechanical wear of the surfaces, a lubricant also may inhibit corrosion of the surfaces and/or may inhibit damage to the surfaces due to heat or oxidation. Examples of lubricant compositions include, but are not limited to, gear oils, transmission oils, hydraulic oils, engine oils, grease, marine oils and industrial lubricating oils.

A typical lubricant composition includes a base fluid and optionally one or more additives. Conventional base fluids are naturally occurring hydrocarbons, such as mineral oils, or synthetic compositions, such as poly-alpha-olefins, poly alkyl(meth)acrylates, and ethylene-propylene copolymers. The terminology base oil or base fluid is commonly used interchangeably. Here, base fluid is used as a general term.

A wide variety of additives may be combined with the base fluid, depending on the intended use of the lubricant. Examples of lubricant additives include, but are not limited to, oxidation inhibitors, corrosion inhibitors, dispersing agents, high pressure additives, anti-foaming agents and metal deactivators. For improvement of viscometric properties, viscosity index improvers (VII) and thickeners may be used. These viscosity modifiers are usually of polymeric type.

However, one disadvantage of adding polymeric additives to a lubricant formulation is that over time they undergo shear stress and mechanically degrade. Polymers with higher molecular weight are better thickeners but are more prone to shear stress leading to polymer degradation. By decreasing the molecular weight of a polymer, a more shear stable polymer is obtained. Nevertheless, these shear stable low molecular weight polymers are no longer very effective thickeners and must be used in larger concentrations in the lubricant in order to reach a desired viscosity. These low molecular weight polymers typically have molecular weights below 20,000 g/mol and are also called synthetic high viscosity base fluids.

Typical polymeric additives on the market such as poly alkyl(meth)acrylates (PAMAs) have various drawbacks in different lubricant oil compositions. One example is the large amount of PAMA product required in these compositions to achieve the desired viscometric properties. A further example is the solubility issues of the PAMA products with different types of base oils. A further drawback of conventional PAMA-based lubricant additives are poor traction properties.

Alternatively, some lubricant additives are based on isoprene and butadiene, such as in U.S. Pat. No. 7,163,913B2, which discloses linear, radial and star-shaped statistical copolymers of isoprene and butadiene, wherein at least 70 wt % of the butadiene is incorporated into the polymer and the weight ratio of isoprene to butadiene is in the range of from 90:10 to 70:30, suitable for use a viscosity index improvers for lubricating oil compositions.

There is still a need to find new lubricant additives that do not only combine a high thickening efficiency, good oil solubility, good shear stability, high viscosity index in lubricant oil compositions, but also improve the traction properties of the lubricant oil compositions.

Therefore, the aim of the present invention is to provide a highly effective synthetic base fluid or lubricating oil additive for lubricant oil compositions, in comparison to the existing technology. The objective of these new polymers is to provide excellent properties in lubricant oil compositions, in particular in terms of thickening efficiency, shear stability and traction. These shear stable polymers described should be able to thicken an oil to a desired viscosity using a lower quantity of polymer in comparison to the typically used poly alkyl(meth)acrylates. Furthermore, the polymer should show a high viscosity index in lubricant oil compositions, as well as excellent solubility in typical base fluids.

SUMMARY OF THE INVENTION

After an exhaustive investigation, the inventors of the present invention have surprisingly found that the hydrogenated linear copolymers consisting of butadiene, isoprene and optionally alkyl(meth)acrylates monomer units, as defined in claim 1, provide excellent properties in lubricant oil compositions, in particular in terms of thickening efficiency and traction performances when added to a lubricating oil composition.

Thus, a first object of the present invention is a hydrogenated linear copolymer as defined in claim 1 and its dependent claims.

A second object of the present invention relates to a process for preparing the hydrogenated linear copolymer according to the present invention.

A third object of the present invention is a lubricating oil composition comprising the hydrogenated linear copolymer according to the present invention.

A fourth object of the present invention is the use of the hydrogenated linear copolymer of the present invention in a lubricating oil composition as a synthetic base fluid or as a lubricating additive in a synthetic base fluid, in particular in a gear oil composition, a transmission oil composition, a hydraulic oil composition, an engine oil composition, a marine oil composition, an industrial lubricating oil composition or in grease.

A further object of the present invention is a method for improving the traction coefficient of a lubricating oil composition, wherein the method comprises the step of adding a hydrogenated linear copolymer as defined in the present invention to a base oil of the lubricating oil composition.

DETAILED DESCRIPTION OF THE INVENTION

Hydrogenated polybutadiene-isoprene copolymers according to the invention

According to a first aspect of the invention, the invention relates to a hydrogenated linear copolymer, obtainable by polymerizing a monomer composition consisting of:
 a) 10 to 60 mol-% of 1,3-butadiene monomer,
 b) 40 to 90 mol-% of isoprene,
 c) 0 to 40 mol-% of one or more C1-C6 alkyl(meth)acrylates, and
 d) 0 to 30 mol-% of one or more C7-C24 alkyl(meth)acrylates,
based on the total amount of monomers in the monomer composition,
wherein the total amount of monomers a) and b) sums up to at least 60 mol-% of the total amount of the monomer composition, and
wherein the hydrogenated linear copolymer has a weight-average molecular weight comprised in the range between 2,000 g/mol and 30,000 g/mol and has a degree of hydrogenation of more than 95%.

Indeed, the inventors of the present invention have surprisingly found out that the above-defined combination of specific amounts of butadiene and isoprene leads to the formation of hydrogenated linear copolymers with good solubility in oil. According to the invention, the total amount of butadiene (monomer a) and isoprene (monomer b) in the hydrogenated polybutadiene isoprene copolymer must sum up to at least 60 mol-% of the total amount of the monomer composition, and the amount of butadiene should not exceed 60 mol-%, based on the total amount of the monomer composition. In contrast, as shown in the experimental part of the present invention, pure hydrogenated polyisoprene or copolymers comprising isoprene and butadiene not fulfilling the monomer unit proportions as defined in claim 1, do not have good overall performance, in particular, with regard to having a high thickening efficiency while maintaining good traction properties. Therefore, it was unexpected to reach excellent performances in oil when combining these two dienes together according to the ratios as defined in claim 1.

According to a preferred embodiment of the invention, the hydrogenated copolymer has a weight-average molecular weight comprised in the range between 3,000 g/mol and 20,000 g/mol, more preferably 4,000 g/mol and 18,000 g/mol, most preferably 5,000 g/mol and 15,000 g/mol. Polymers having this weight-average molecular weight have a particularly good shear resistance and offer excellent improvements of the viscometric properties of a lubricant compositions, even at low amounts of the copolymer.

Preferably, the copolymers of the invention have a very low degree of cross-linking and a narrow molecular weight distribution, which further contribute to their shear resistance. The low degree of crosslinking and the narrow molecular weight are reflected in the polydispersity index of the copolymers. Preferably, the polydispersity index (PDI) of the copolymers according to the invention is in the range of 1.0 to 4.0, more preferably 1.0 to 3.3. A polydispersity index in the range of 1.0 to 3.3 is considered optimal for most industrial applications with regard to the shear resistance of the copolymers. The polydispersity index is defined as the ratio of weight-average molecular weight to number-average molecular weight (Mw/Mn).

The weight-average and number-average molecular weights are determined by gel permeation chromatography using commercially available polybutadiene calibration standards. The determination is preferably performed according to DIN 55672-1 by gel permeation chromatography with THF as eluent.

According to a preferred embodiment of the invention, the hydrogenated linear copolymer is a statistical copolymer or a block copolymer, preferably a statistical copolymer.

Monomers

In the present invention, isoprene can also be referred to 2-methyl-1,3-butadiene.

In the present invention, butadiene can also be referred to 1,3-butadiene.

According to a preferred embodiment, in addition to monomers a) and b), the hydrogenated linear copolymers of the invention may optionally comprise monomers derived from $C_1$-$C_6$ alkyl(meth)acrylates as monomer c), monomers derived from $C_7$-$C_{24}$ alkyl(meth)acrylates as monomer d) or a mixture thereof.

The term "(meth)acrylic acid" refers to acrylic acid, methacrylic acid and mixtures of acrylic acid and methacrylic acid; methacrylic acid being preferred. The term "(meth)acrylate" refers to esters of acrylic acid, esters of methacrylic acid or mixtures of esters of acrylic acid and methacrylic acid; esters of methacrylic acid being preferred.

The term "$C_{1-6}$ alkyl(meth)acrylates" refers to esters of (meth)acrylic acid and straight chain or branched alcohols having 1 to 6 carbon atoms. The term encompasses individual (meth)acrylic esters with an alcohol of a particular length, and likewise mixtures of (meth)acrylic esters with alcohols of different lengths. Similarly, the term "$C_{7-24}$ alkyl(meth)acrylates" refers to esters of (meth)acrylic acid and straight chain or branched alcohols having 7 to 24 carbon atoms.

Suitable $C_{1-6}$ alkyl (meth)acrylates for monomer c) include, for example, methyl (meth)acrylate, ethyl (meth)acrylate, n-propyl (meth)acrylate), iso-propyl (meth)acrylate, n-butyl (meth)acrylate, iso-butyl (meth)acrylate and tert-butyl (meth)acrylate. In a preferred embodiment, preferred $C_{1-6}$ alkyl (meth)acrylates are methyl (meth)acrylate, butyl (meth)acrylate or a mixture of methyl (meth)acrylate and butyl (meth)acrylate. More preferably, the butyl (meth)acrylate is n-butyl (meth)acrylate.

Suitable $C_{7-24}$ alkyl (meth)acrylates for monomer d) include, for example, 2-butyloctyl (meth)acrylate, 2-hexyloctyl (meth)acrylate, decyl (meth)acrylate, 2-butyldecyl (meth)acrylate, 2-hexyldecyl (meth)acrylate, 2-octyldecyl (meth)acrylate, undecyl (meth)acrylate, 5-methylundecyl (meth)acrylate, dodecyl (meth)acrylate, 2-methyldodecyl (meth)acrylate, 2-hexyldodecyl (meth)acrylate, 2-octyldodecyl (meth)acrylate, tridecyl (meth)acrylate, 5-methyltridecyl (meth)acrylate, tetradecyl (meth)acrylate, 2-decyltetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyl-eicosyl (meth)acrylate, stearyl-eicosyl (meth)acrylate, docosyl (meth)acrylate, or 2-decyl-tetradecyl (meth)acrylate. In a particularly preferred embodiment, monomer (d) comprises one or more $C_{10}$-$C_{16}$ alkyl(meth)acrylates, which refers to esters of (meth)acrylic acid and straight chain or branched alcohols having 10 to 16 carbon atoms. Preferably, monomer (d) comprises lauryl (meth)acrylate (straight chain $C_{12}$-$C_{15}$ alkyl(meth)acrylates).

Monomer Compositions

As mentioned above, the invention relates to a hydrogenated linear copolymer, obtainable by polymerizing a monomer composition consisting of:
- a) 10 to 60 mol-% of 1,3-butadiene monomer,
- b) 40 to 90 mol-% of isoprene,
- c) 0 to 40 mol-% of one or more $C_1$-$C_6$ alkyl(meth)acrylates, and
- d) 0 to 30 mol-% of one or more $C_7$-$C_{24}$ alkyl(meth)acrylates, based on the total amount of monomers in the monomer composition, wherein the total amount of monomers a) and b) sum up to at least 60 mol-% of the total amount of the monomer composition, and wherein the hydrogenated copolymer has a weight-average molecular weight comprised in the range between 2,000 g/mol and 30,000 g/mol and has a degree of hydrogenation of more than 95%.

In a preferred embodiment, the monomer composition above-indicated consists of:
- a) 10 to 60 mol-% of 1,3-butadiene monomer,
- b) 40 to 90 mol-% of isoprene,
- c) 0 to 20 mol-% of one or more $C_1$-$C_6$ alkyl(meth)acrylates, and
- d) 0 to 20 mol-% of one or more $C_7$-$C_{24}$ alkyl(meth)acrylates, based on the total amount of monomers in the monomer composition.

According to a preferred embodiment, the above-defined monomer composition may further comprise alkyl (meth)acrylate monomers c) or d) or a mixture thereof.

In a preferred embodiment, the monomer composition consists of:
- a) 10 to 60 mol-% of 1,3-butadiene monomer,
- b) 40 to 90 mol-% of isoprene,
- c) 1 to 30 mol-% of one or more $C_1$-$C_6$ alkyl(meth)acrylates, and
- d) 0 to 30 mol-% of one or more $C_7$-$C_{24}$ alkyl(meth)acrylates, based on the total amount of monomers in the monomer composition.

In a preferred embodiment, the monomer composition consists of:
- a) 10 to 60 mol-% of 1,3-butadiene monomer,
- b) 40 to 90 mol-% of isoprene,
- c) 1 to 20 mol-% of one or more $C_1$-$C_6$ alkyl(meth)acrylates, and
- d) 0 to 30 mol-% of one or more 07-024 alkyl(meth)acrylates, based on the total amount of monomers in the monomer composition.

In another preferred embodiment, the monomer composition consists of:
- a) 10 to 60 mol-% of 1,3-butadiene monomer,
- b) 40 to 90 mol-% of isoprene,
- c) 1 to 20 mol-% of one or more $C_1$-$C_6$ alkyl(meth)acrylates, and
- d) 5 to 20 mol-% of one or more 07-024 alkyl(meth)acrylates, based on the total amount of monomers in the monomer composition.

According to a preferred embodiment, in the above-defined preferred monomer compositions, the one or more $C_1$ to $C_6$ alkyl (meth)acrylate monomer c) is selected from methyl (meth)acrylate, butyl (meth)acrylate or a mixture thereof, and the one or more $C_7$ to $C_{24}$ alkyl (meth)acrylate monomer d) is lauryl (meth)acrylate.

Process for Preparing the Copolymers of the Invention

As explained above, the inventive hydrogenated polybutadiene-isoprene copolymers are prepared following a process comprising the steps of:
- (i) providing a monomer composition as defined above,
- (ii) initiating polymerization in solution in the monomer composition to obtain a copolymer, and
- (iii) hydrogenation of the copolymer of step (ii).

Polymerization Step (ii)

According to a preferred embodiment, the polymerization of step (ii) is a radical or an anionic polymerization in solution, more preferably a radical polymerization in solution.

Radical Polymerization

Standard free-radical polymerization is detailed, inter alia, in Ullmann's Encyclopedia of Industrial Chemistry, Sixth Edition. In general, a polymerization initiator and optionally a chain transfer agent are used for this purpose.

The copolymers of the invention can be obtained via ATRP methods. This reaction regime is described, for example, by J.-S. Wang, et al., J. Am. Chem. Soc, vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-elucidated ATRP.

Furthermore, the copolymers of the invention can also be obtained via RAFT methods. For example, the RAFT method is described in detail in WO 98/01478 and WO 2004/083169.

According to a preferred embodiment, the statistical copolymers of the invention are prepared by free radical solution polymerization, in which case the reaction mixture during step (ii) preferably comprises the monomer composition (step (i)), one or more radical initiators, a solubilizing carrier medium as described below and optionally one or more chain transfer agents.

Solution polymerization is the preferred method for carrying out the process of the invention, because it allows adjusting the concentration of the monomer composition in the reaction mixture by adding more or less solubilizing carrier medium. By selecting the correct concentration of the monomer composition in the reaction mixture, the molecular weight and the polydispersity index of the resulting copolymer can be controlled.

Preferably, the total amount of monomer composition in the reaction mixture is between 5 and 95% by weight, more preferably 10 to 70% by weight, even more preferably 20 to 55% by weight, most preferably 35 to 50% by weight, based on the total weight of the reaction mixture. Monomer concentrations higher than 20% are usually preferred on industrial scale. A concentration of the monomer composition in the range of 20 to 55% by weight, preferably 35 to 50% by weight, based on the total weight of the reaction mixture, is considered optimal, because it yields statistical copolymers having a low weight-average molecular weight in the range of 2,000 to 30,000 g/mol and a low polydispersity index in the range of 1.0 to 3.3.

The polymerization is preferably performed at a temperature of 20° C. to 200° C., more preferably 50° C. to 150° C., the reaction pressure is preferably 1 bar to 30 bar, more preferably 10 bar to 28 bar and the total reaction time of the radical polymerization is 1 to 10 hours.

Preferably, the solubilizing carrier medium used is selected from the group consisting of mineral oils, synthetic oils, ketones, ester solvents, aromatic hydrocarbons, cycloaliphatic hydrocarbons and aliphatic hydrocarbons or mixtures thereof.

Examples for mineral oils are paraffinic oils, naphthenic oils, solvent-refined oils, isoparaffin-containing high VI oils and hydrocracked high VI oils. Examples for synthetic oils are organic esters, for example diesters and polyesters, like carboxylic esters and phosphate esters; organic ethers like silicone oils, perfluoro-alkyl ethers and polyalkylene glycol; and synthetic hydrocarbons, especially polyolefins and Gas to Liquids oils (GTL). Examples for ketones are butanone and methyl ethyl ketone. Examples for ester solvents are fatty oils, and synthetic ester lubricants (for example, di-C4-12 alkyl C4-12 dicarboxylates, such as dioctyl sebacate and dioctyl adipate, polyol poly-C4-12 alkanoates, such as pentaerythritol tetra-caproate; and tri-C4-12 hydrocarbyl phosphates, such as tri-2-ethylhexyl phosphate, dibutyl phenyl phosphate, di-2-ethylhexyl phenyl phosphate, 2-ethylhexyl diphenyl phosphate and tricresyl phosphate). Examples for aromatic hydrocarbons are benzene, toluene, xylene, ethylbenzene, trimethyl benzene, ethyl toluene and mixtures of them. Examples for cycloaliphatic hydrocarbons are cyclohexane, methyl cyclohexane and cycloaliphatic terpenes. Examples for aliphatic hydrocarbons are n-pentane, n-hexane, n-heptane, 1-decene and aliphatic terpenes.

In a preferred embodiment, the solubilizing carrier medium is a cycloaliphatic or aliphatic or aromatic hydrocarbon, preferably cyclohexane or toluene.

Step (ii) comprises the addition of a radical initiator.

Suitable radical initiators are, for example, azo initiators, such as azobis-isobutyronitrile (AIBN), 2,2'-azobis(2-methylbutyronitrile) (AMBN) and 1,1-azobiscyclohexanecarbonitrile, and peroxy compounds such as methyl ethyl ketone peroxide, acetylacetone peroxide, dilauryl peroxide, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide and bis(4-tert-butylcyclohexyl) peroxydicarbonate.

Preferably, the radical initiator is selected from the group consisting of 2,2'-azobis(2-methylbutyronitrile), 2,2-bis(tert-butylperoxy)butane, 1,1-di-tert-butylperoxy-3,3,5-trimethylcyclohexane, tert-butyl peroxybenzoate and tert-butylperoxy-3,5,5-trimethylhexanoate. In a particularly preferred embodiment the radical initiator is 2,2-bis(tert-butylperoxy)butane.

Preferably, the total amount of radical initiator relative to the total weight of the monomer mixture is 0.01 to 5% by weight, more preferably 0.02 to 1% by weight, most preferably 0.05 to 0.5% by weight.

The total amount of radical initiator may be added in a single step or the radical initiator may be added in several steps over the course of the polymerization reaction. For example, a part of the radical initiator may be added to initiate radical polymerization and a second part of the radical initiator may be added 0.5 to 3.5 hours after the initial dosage. Preferably, the radical initiator is added in a single step.

Step (ii) optionally comprises the addition of a chain transfer agent. Examples of chain transfer agents are sulfur containing compounds such as thiols, e.g. n- and t-dodecanethiol, 2-mercaptoethanol, and mercapto carboxylic acid esters, e.g. methyl-3-mercaptopropionate or longer chain alkenes. Preferred chain transfer agents are alkenes having up to 20 carbon atoms, especially up to 15 carbon atoms and more preferably up to 12 carbon atoms.

After completion of the radical polymerization, the product is preferably filtered to remove any impurities present in the reaction mixture, followed by the evaporation of any volatile solvents.

Anionic Polymerization

An alternative route to carrying out the step (ii) of the process, is by preparing the polybutadiene-isoprene polymer of the invention via living anionic polymerization of butadiene and isoprene monomers.

This type of reaction is well-established and described in detail in H. L. Hsieh, R. P. Quirk. Anionic Polymerization. Principles and Practical Applications, 1996, Marcel Dekker, Inc. New York.

According to the present invention, batch or semi-batch type processes are preferred for living anionic polymerization of 1,3-butadiene and isoprene. Living polymerization in continuous process can also be considered.

The polymerization is commonly performed in aliphatic, cycloaliphatic or aromatic hydrocarbon solvents. Examples for aliphatic hydrocarbon solvents are hexane or heptane. Examples for cycloaliphatic hydrocarbon solvents are cyclohexane or methylcyclohexane. Examples for aromatic hydrocarbon solvents are benzene or toluene. Polar, heteroaliphatic solvents such as tertiary amines and/or ethers and/or cyclic ethers may also be used as solvents or co-solvents. Examples for tertiary amines are tetramethylenediamine or N,N,N',N'',N''-pentamethyldiethylenediamine. Examples for ethers or cyclic ethers are diethyl ether and tetrahydrofuran. It is common to use solvent mixtures of aliphatic, cycloaliphatic or aromatic hydrocarbon solvents and polar, heteroaliphatic solvents.

Common initiators are organometallic reagents where the metal is from the group of alkali metals or from the group of alkaline earth metals. Typical examples are mono- or bi-functional organosodium, organolithium or organopotassiumas initiators such as n-butyl lithium, sec-butyl lithium, tert-butyl lithium, 1,1-diphenylhexyl lithium, diphenylmethyl lithium, 1,1,4,4,-tetraphenyl-1,4-dilithium butane, lithium naphthalene and their sodium and potassium homologues. Preferably organolithium initiators are used, more preferably n-butyl lithium initiator is used.

Under exclusion of oxygen and protic reagents, the living character of anionic polymerization provides excellent control over the resulting molecular weight and the polydispersity index (PDI).

In general, the polymerization reaction is terminated using a protic reagent such as methanol, ethanol, 2-propanol or water for neutralization of the macroanion.

Typical reaction temperatures range between 10° C. and 120° C. and typical reaction pressures range between 1 and 100 bar.

Hydrogenation Step (iii)

On an industrial scale for this present invention, it is required to have a hydrogenated copolymer without the presence of double bonds as this reduces the reactivity of the copolymer against chemical oxidation, cross-linking or other undesired side reactions. Therefore, in step (iii), the inventors of the present invention carried out a selective hydrogenation of the diene units as described below.

According to the present invention, the monomer units derived from butadiene and isoprene are hydrogenated. A high degree of hydrogenation of polyisoprene-butadiene copolymer of more than 95%, in relation to the polymerized units derived butadiene and isoprene, is desired in order to improve stability against oxidation. The hydrogenation is selective and does not affect the monomer units c) and d) derived from the optional (meth)acrylic acid esters.

The selectivity of the hydrogenation can be probed by, for example, quantitative $^1$H nuclear magnetic resonance CH NMR) spectroscopy or infrared (IR) spectroscopy. The hydrogenation degree is defined as the molar degree of saturation of carbon-carbon bonds of the polymerized units derived from conjugated dienes through addition of hydrogen relative to the non-hydrogenated starting material. The degree of hydrogenation of the statistical copolymer according to the present invention is measured by $^1$H NMR spectroscopy in deuterated chloroform solution using dimethyl terephthalate as standard. The chemical shifts are calibrated using the solvent signal. To determine the hydrogenation degree, the respective signal integrals of the standard are put into relation with the signal integrals of the olefinic protons. It is necessary for each sample to repeat the measurement and determination using a non-hydrogenated reference sample in order to define 0% degree of hydrogenation.

Selective hydrogenation of the copolymers of the invention is typically performed in the presence of at least one solubilizing carrier medium using hydrogen gas or other hydrogen sources as reduction agents either in heterogeneous fashion using insoluble, supported metal or metal complex catalysts or in homogeneous fashion using soluble, organometallic catalysts. A detailed description of homogeneously catalyzed hydrogenation can be found for example in U.S. Pat. No. 3,541,064 and GB 1,030,306. Since it offers economic advantages, heterogeneous catalysis using insoluble, supported metals as catalysts is widely used for industrial selective hydrogenation processes and usually preferred over other processes. Preferably, selective hydrogenation process is a heterogeneous catalysis process using insoluble, supported metals as catalyst.

Typical catalytically active metals for heterogeneously catalyzing the selective hydrogenation according to the invention include, but are not limited to, Ru, Rh, Pd, Ir, Pt, Mn, Cr, Fe, Co, Ni, U, Cu, Nd, In, Sn, Zn, Ag, Cr and alloys of one or more of these metals.

Typical catalyst supports include, but are not limited to oxides ($Al_2O_3$, $TiO_2$, $SiO_2$ or others), carbon, kieselguhr or other carriers.

Furthermore, the heterogeneous catalysts can be used, for example, in the form of pellets or powders.

In a preferred embodiment, the selective hydrogenation process is preferably performed using a heterogeneous carbon-supported Pd catalyst in powder form. The use of a carbon-supported Pd catalyst is preferred because it performs the hydrogenation of the double bonds derived from butadiene and isoprene with high selectivity and reactivity.

The amount of catalytically active metal loaded on the support preferably is 0.1 to 10% by weight, more preferably 1 to 10% by weight, based on the total weight of the supported catalyst.

In the case that hydrogen gas is used as a reducing agent, the reaction pressure preferably is between 5 and 1500 bar, either as constant or gradient pressure. More preferably, the reaction pressure is 5 to 500 bar, even more preferably 5 to 250 bar, and most preferably 10 to 90 bar.

The concentration of the statistical copolymer in the solubilizing carrier medium in the hydrogenation step (iii) can typically be in the range of 5 and 95% by weight. Preferably, the concentration of the statistical copolymer in the solubilizing carrier medium is 10 to 70% by weight of statistical copolymer, based on the total weight of copolymer and carrier medium.

In a preferred embodiment, hydrogenation is carried out in the presence of a cycloaliphatic or aliphatic hydrocarbon, preferably cyclohexane.

The reaction temperature in the hydrogenation step (iii) preferably is 0 to 200° C., more preferably 20 to 150° C., even more preferably 20 to 120° C.

In a particularly preferred embodiment, hydrogenation is carried out in the presence of a carbon-supported Pd catalyst at a temperature of 20 to 120° C., a pressure of 10 to 90 bar and cyclohexane as the solubilizing carrier medium. It has been found that these conditions are optimal for preparing the above-described copolymers, as they lead to high reactivity and selectivity in the selective hydrogenation of the double bonds derived from the conjugated dienes.

Lubricating Oil Compositions

The invention also relates to a composition comprising
(x) one or more base oil, and
(y) one or more of the above-mentioned hydrogenated linear copolymer of the present invention.

The lubricant composition of the invention preferably has a viscosity index of more than 140. The viscosity index may be measured according to ASTM D2270.

Preferably, the lubricating oil composition comprises 0.5 to 80% by weight, more preferably 1 to 50% by weight, even more preferably 1 to 30% by weight, most preferably 1 to 15% by weight, of the one or more hydrogenated linear copolymer, and 20 and 99.5% by weight, more preferably 50 to 99% by weight, even more preferably 70 to 99% by weight, most preferably 85 to 99% by weight of the one or more base oil, based on the total amount of the lubricating oil composition.

If the lubricant composition according to the present invention is used as an engine oil, it preferably comprises between 0.5% by weight and 20% by weight of the copolymers according to the invention, based on the total weight of the lubricant composition, leading to a kinematic viscosity at 100° C. being in the range from 3 $mm^2/s$ to 10 $mm^2/s$ according to ASTM D445.

If the lubricant composition of the present invention is used as an automotive gear oil, it preferably comprises between 2% by weight to 35% by weight of the copolymers according to the invention, based on the total weight of the lubricant composition, leading to a kinematic viscosity at 100° C. being in the range from 2 $mm^2/s$ to 15 $mm^2/s$ according to ASTM D445.

If the lubricant composition of the present invention is used as an automatic transmission oil, it preferably comprises between 1% by weight and 25% by weight of the copolymers according to the invention in the base oil, based on the total weight of the lubricant composition, leading to a kinematic viscosity at 100° C. being in the range from 2 $mm^2/s$ to 9 $mm^2/s$ according to ASTM D445.

If the lubricant composition of the present invention is used as an industrial gear oil, it preferably comprises between 15% by weight and 80% by weight of the copolymers according to the invention, based on the total weight of the lubricant composition, leading to a kinematic viscosity at 100° C. being in the range from 10 $mm^2/s$ to 130 $mm^2/s$ according to ASTM D445.

If the lubricant composition of the present invention is used as a hydraulic oil, it preferably comprises between 1% by weight to 20% by weight of the copolymers according to the invention, based on the total weight of the lubricant composition, leading to a kinematic viscosity at 100° C. being in the range from 3 mm²/s to 20 mm²/s according to ASTM D445.

Preferably, the amounts of (x) and (y) add up to 100% by weight, based on the total weight of the lubricant composition.

Base Oils

The base oil to be used in the composition preferably comprises one or more oils of lubricating viscosity. Such oils correspond to lubricant base fluids, mineral, synthetic or natural, animal or vegetable oils suited to their use/chosen depending on the intended use.

The base fluids used in formulating the lubricating oil compositions according to the present invention include, for example, conventional base stocks selected from API (American Petroleum Institute) base stock categories known as Group I, Group II, Group III, Group IV and Group V. The Group I and II base stocks are mineral oil materials (such as paraffinic and naphthenic oils) having a viscosity index (or VI) of less than 120. Group I is further differentiated from Group II in that the latter contains greater than 90% saturated materials and the former contains less than 90% saturated material (that is more than 10% unsaturated material). Group III is considered the highest level of mineral base fluid with a VI of greater than or equal to 120 and a saturates level greater than or equal to 90%. Group IV base fluids are polyalphaolefins (PAO). Group V base fluids are esters and any other base fluids not included in Group I to IV base fluids. These base fluids can be used individually or as a mixture.

Preferably, the one or more base oil (x) is selected from a polyalphaolefin base oil, an API group III base oil, or a mixture thereof.

Additional Additives

The lubricating oil compositions according to the present invention may also further comprise any other additional additives (z) suitable for use in the formulations. These additives are selected from the group consisting of a viscosity index improver, a pour point improver, a dispersant, a demulsifier, a lubricity additive, a detergent, a defoamer, a corrosion inhibitor, a friction modifier, an antioxidant, an antiwear additive, an extreme pressure additive, an antifatigue additive, a dye, an odorant or a mixture thereof. Preferably, the lubricating oil compositions according to the present invention comprises a pour point depressant (PPD), to lower the minimum temperature at which the fluid will flow or can be poured. Such additives are well known. Typical of those PPDs include ethylene-vinyl acetate copolymers, chlorinated paraffin-naphthalene condensates, chlorinated paraffin-phenol condensates, polymethacrylates, polyalkylstyrenes. Preferred are polymethacrylates having a mass-average molecular weight from 5.000 to 200.000 g/mol.

Preferably, the amounts of components (x), (y) and (z) add up to 100% by weight, based on the total weight of the lubricating oil composition.

Applications for the Hydrogenated Linear Copolymers According to the Invention

The invention relates to the use of the hydrogenated linear copolymer according to the present invention as a lubricating oil additive or a synthetic base fluid, depending on the treat rate in the lubricating oil composition, preferably in a gear oil composition, a transmission oil composition, a hydraulic oil composition, an engine oil composition, a marine oil composition, an industrial lubricating oil composition or in grease.

As shown in the experimental part below, the use of the hydrogenated linear copolymer according to the invention in a lubricating oil composition allows to improve the traction coefficient of the lubricating oil composition while maintaining excellent thickening efficiency and shear stability in said composition.

The invention also relates to a method for improving the traction coefficient of a lubricating oil composition, wherein said method comprises the step of adding to a base oil, a hydrogenated linear copolymer according to the present invention and as described in detail above.

As shown in the experimental part below, there is an exceptional improvement in lubricant oil compositions, in terms of the traction coefficient as well as the thickening efficiency thanks to the positive effect of the hydrogenated linear copolymer according to the present invention. Furthermore, the hydrogenated linear copolymers as defined in the present invention maintain a high viscosity index, good shear stability, excellent low temperature properties, as well as excellent solubility in typical base fluids.

Experimental Part

The invention is further illustrated in detail hereinafter with reference to examples and comparative examples, without any intention to limit the scope of the present invention.

Abbreviations

PMMA poly alkyl(meth)acrylate
MMA $C_1$-alkyl methacrylate=methyl methacrylate
BMA $C_4$-alkyl methacrylate=n-butyl methacrylate
LMA $C_{12/14}$-alkyl methacrylate=lauryl methacrylate
KRL Kegelrollenlager (=tapered roller bearing)
$KV_{40}$ kinematic viscosity @40° C., measured according to ASTM D445
$KV_{100}$ kinematic viscosity @100° C., measured according to ASTM D445
$M_n$ number-average molecular weight
$M_w$ weight-average molecular weight
NB3030 Nexbase®3030, Group III base oil from Neste with a $KV_{100}$ of 3.0 cSt
NB3043 Nexbase®3043, Group III base oil from Neste with a $KV_{100}$ of 4.3 cSt
PDI polydispersity index, molecular weight distribution calculated via Mw/Mn
PSSI100 permanent shear stability index (calculation based on $KV_{100}$ before and after shear)
VI Viscosity Index, measured according to ASTM D2270
GPC gel permeation chromatography
MTM Mini Traction Machine
PP Pour point, measured according to ASTM D 97.
$T_g$ Glass transition temperature, measured via differential scanning calorimetry
BF Brookfield viscosities, measured according to ASTM D 2983 at −40° C.

Sample Preparation

Synthesis of Polymers

Inventive copolymers 1 to 8 and Comparative examples 10 to 12 were prepared by free radical solution polymerization using the monomer compositions shown in table 1 below. The monomers were mixed with toluene at a temperature of 20° C. and a pressure of 10 bar in a 5 L autoclave so that the concentration of the monomers relative to the total weight of the mixture is 40% by weight. The temperature was increased to 130° C. using a heat rate of 5.5° C./min, before the initiator, 2,2-bis(tert-butylperoxy)butane (50% by weight in liquid paraffin) was added. Free radical copolymerization was performed at a reaction temperature of 130° C., a reaction pressure of approximately 20 bar and a reaction time of 3 h. The discharge was filtered and volatile solvents were evaporated. The obtained copolymers were then selectively hydrogenated.

Hydrogenation of Copolymers

For selective hydrogenation, 1.5 L of a 40% solution by weight of an unsaturated copolymer in cyclohexane was charged to a 2 L autoclave and 0.15% by weight of Pd per polymer of a 5% Pd/C catalyst powder were introduced. Hydrogenation was carried out under stirring at a reaction temperature of 90° C. and a H2 reaction pressure of 90 bar until a hydrogenation degree of 95% or higher was achieved. The discharge was filtered and volatile components were evaporated. All polymerized units other than those derived from the conjugated dienes (butadiene and isoprene) were not converted during selective hydrogenation. All inventive copolymers 1 to 8 and Comparative examples 10 to 12 were hydrogenated following this procedure.

Examples (as Also Shown in Table 1 Below)

Inventive examples 1 to 4 are based on the monomer composition of butadiene and isoprene.

Inventive examples 5 and 6 are based on the monomer composition of butadiene, isoprene and methyl (meth)acrylate.

Inventive examples 7 and 8 are based on the monomer composition of butadiene, isoprene, methyl (meth)acrylate, butyl (meth)acrylate and lauryl (meth)acrylate.

Comparative example 9, PAMA, is copolymer of $C_{12-15}$ methacrylates synthesized according to Example 1 in US2013/0229016A1.

Comparative example 10 is a copolymer of 80 mol-% (76% by weight) of butadiene and 20 mol-% (24% by weight) of isoprene, such as disclosed in U.S. Pat. No. 7,163,913B2.

Comparative example 11 is based on the monomer composition butadiene, methyl (meth)acrylate, butyl (meth)acrylate and lauryl (meth)acrylate. This product is synthesized using the same method as for the inventive examples.

Comparative example 12 is based on pure polyisoprene and is synthesized using the same method as for the inventive examples.

Bulk Polymer Properties

Test Methods

The weight-average molecular weight $M_W$ and the polydispersity index PDI of the hydrogenated linear copolymers of the invention were determined using a Tosoh EcoSEC GPC system "HLC-8320" equipped with a PSS SDV 5 µm pre-column and a 30 cm PSS SDV 5 µm linear S separation column, as well as an RI detector at a flow rate of 0.3 mL/min at T=40° C. with tetrahydrofuran (THF) as eluent against polybutadiene calibration standards.

The weight-average molecular weight of the comparative polyalkyl (meth)acrylate example 9 was determined by gel permeation chromatography (GPC) using polymethyl methacrylate calibration standards and THF as the eluent.

The composition of the copolymers of the invention, the degree of hydrogenation and the selectivity of the hydrogenation process were determined by means of 1H-NMR spectroscopy in deuterated chloroform.

Glass transition temperatures were measured via differential scanning calorimetry on a Mettler-Toledo DSC1. Mettler Toledo STARe 10.00 software was used for analysis. Indium and cyclohexane were used as standard. In two heating/cooling cycles 8 to 10 mg of the samples were cooled to −80° C. with a cooling rate of 20 K/min. After 10 min, the samples were heated to 200° C. with a heat rate of 10 K/min. The glass transition temperatures were derived from the second heating cycle.

As reflected in Table 1 below, the bulk properties of the inventive hydrogenated linear copolymers of the invention are all very satisfactory with low PDI values, Mw and glass transition temperatures. Additionally, a high level of control during the synthesis is observed as the PDI values of the hydrogenated copolymers of the invention are all lower than 3.3.

Furthermore, the obtained hydrogenated linear copolymers of the present invention all have a high level of hydrogenation (more than 96% of the isoprene and butadiene is hydrogenated). The degree of hydrogenation was calculated as described above in the section relating to hydrogenation.

TABLE 1

Bulk Polymer Properties

| Polymer Examples | | Inventive Examples | | | | | | | | Comparative Examples | | | |
|---|---|---|---|---|---|---|---|---|---|---|---|---|---|
| | | Ex. 1 | Ex. 2 | Ex. 3 | Ex. 4 | Ex. 5* | Ex. 6* | Ex. 7* | Ex. 8** | Comp Ex. 9 | Comp Ex. 10 | Comp Ex. 11 | Comp Ex. 12 |
| Isoprene | [mol %] | 55 | 55 | 80 | 80 | 47 | 52 | 44 | 64 | — | 20 | — | 100 |
| Butadiene | [mol %] | 45 | 45 | 20 | 20 | 38 | 43 | 36 | 16 | — | 80 | 40 | — |
| MMA | [mol %] | — | — | — | — | 15 | 5 | 10 | 10 | — | — | 12.5 | — |
| BMA | [mol %] | — | — | — | — | — | — | 3 | 3 | — | — | 12.5 | — |
| LMA | [mol %] | — | — | — | — | — | — | 7 | 7 | 100 | — | 35 | — |
| Mw | [kg/mol] | 8.2 | 11.3 | 7.6 | 10.6 | 13.6 | 9.9 | 11.5 | 10.9 | 14.1 | 16.4 | 12.4 | 7.6 |
| PDI | | 2.75 | 2.40 | 2.20 | 2.40 | 2.59 | 2.85 | 3.07 | 3.00 | 1.70 | 2.12 | 2.64 | 2.94 |
| Degree of hydrogenation | [%] | 99 | 99 | 99 | 99 | 98 | 99 | 96 | 96 | — | 99 | 99 | 99 |
| $T_g$ | [° C.] | −66 | −64 | −64 | −63 | −54 | −66 | −61 | −60 | — | −57 | −56 | −60 |

*Ratio of Butadine:Isoprene is 45:55 respectively.
**Ratio of Butadiene:Isoprene is 20:80 respectively.

Evaluation of the Lubricant Compositions

The use of the copolymers of the present invention as lubricant additives were demonstrated in two different lubricant formulations with the different hydrogenated linear copolymers of the present invention.

Test Methods

The formulation in Table 3 has a KV100 target of 7.0 cSt—Viscosity loss at 100° C. was measured after 40 h at 80° C. in the tapered roller bearing test (KRL) according to CEC-L-45-A-99 against the fresh oil kinematic viscosity at 100° C.

The formulation in Table 4 has a fixed VI-KV40 with a target of 26 cSt and a KV100 with a target of 5.5 cSt. The traction coefficient was measured on a Mini Traction Machine using a ¾ inch ball loaded against a disc with the following conditions as shown in Table 2 below:

TABLE 2

| Test Rig | MTM from PCS Instruments |
|---|---|
| Ball and Disc | AISI 52100 bearing steel Highly polished specimen |
| Speed | 1 000 mm/s |
| Temperature | 40° C. |
| Load | 75 GPa |
| Slide Roll Ratio | 60% |
| Repeats | ×3 |

Kinematic viscosity was measured according to ASTM D 445.

The Viscosity Index was determined according to ASTM D 2270.

Brookfield viscosities reported in the lubricant formulation examples in Table 3 were measured according to ASTM D 2983 at a temperature of −40° C.

The pour point (PP) of the examples shown in Table 3 were measured according to ASTM D 97.

Lubricant Oil Formulation 1 (KV 100=7.0 cSt)

As shown in Table 3 below, some lubricant oil compositions comprising an API group III base fluid (Nexbase 3030), a commercially available additive package and either one of the inventive copolymers 1 to 8 or comparative polymers 9 and 10 were prepared. To compare the individual lubricant oil compositions, the kinematic viscosity at 100° C. was adjusted to 7.0 cSt.

For each composition, viscometric properties as well as shear stability (KRL) and low temperature properties were measured.

An advantage of the present invention is that a low amount (treat rate) of the inventive copolymers 1 to 8 is enough to achieve good kinematic viscosity and a good viscosity index. In contrast, the formulation comprising comparative PAMA additive 9 achieves similar results as the inventive formulations, but with a treat rate of more than 20% by weight (twice the amount of the inventive formulations).

Thus, unexpectedly, even if the inventive additives have a low molecular weight, they are still very effective thickeners, even at low concentrations in the lubricant formulations.

Although similar results to inventive examples in terms of treat rate and VI are observed with comparative example 10, the low temperature properties of comparative example 10 does not fulfill the requirements for use in industrial applications. Therefore, showing that copolymers with a high ratio of butadiene to isoprene are not suitable for preparing a good lubricant additive.

TABLE 3

| Lubricant Oil Formulation (KV 100 = 7.0 cSt) | | | | | | | | | | | |
|---|---|---|---|---|---|---|---|---|---|---|---|
| | | | | | Inventive examples | | | | | Comparative Examples | |
| Lubricant Examples | | Ex. 1 | Ex. 2 | Ex. 3 | Ex. 4 | Ex. 5 | Ex. 6 | Ex. 7 | Ex. 8 | Comp. Ex. 9 | Comp. Ex. 10 |
| Ex. 1 | [wt %] | 9.8 | | | | | | | | | |
| Ex. 2 | [wt %] | | 7.3 | | | | | | | | |
| Ex. 3 | [wt %] | | | 10.5 | | | | | | | |
| Ex. 4 | [wt %] | | | | 7.9 | | | | | | |
| Ex. 5 | [wt %] | | | | | 8.0 | | | | | |
| Ex. 6 | [wt %] | | | | | | 9.9 | | | | |
| Ex. 7 | [wt %] | | | | | | | 11.5 | | | |
| Ex. 8 | [wt %] | | | | | | | | 9.6 | | |
| Comp. Ex. 9 | [wt %] | | | | | | | | | 20.9 | |
| Comp. Ex. 10 | [wt %] | | | | | | | | | | 5.2 |
| Anglamol 99 | [wt %] | 6.5 | 6.5 | 6.5 | 6.5 | 6.5 | 6.5 | 6.5 | 6.5 | 6.5 | 6.5 |
| Nexbase 3030 | [wt %] | 83.7 | 86.2 | 83.0 | 85.6 | 85.5 | 83.6 | 82.0 | 83.9 | 72.6 | 88.3 |
| Formulation Results | | | | | | | | | | | |
| Viscosity at 100° C. | [cSt] | 7.0 | 7.0 | 7.1 | 7.1 | 7.0 | 7.0 | 7.0 | 7.0 | 7.0 | 7.0 |
| Viscosity at 40° C. | [cSt] | 33.1 | 32.6 | 33.5 | 32.9 | 33.0 | 33.5 | 33.2 | 32.8 | 33.5 | 31.9 |
| Viscosity Index | | 183 | 186 | 180 | 185 | 182 | 181 | 181 | 185 | 180 | 190 |
| Viscosity Loss at 80° C. after 40 h | [%] | 12.7 | 17.9 | 12.9 | 18.2 | 10.15 | 8.34 | — | — | 9.3 | 8.16 |
| Pour Point | [° C.] | −30 | −30 | −36 | −39 | −27 | −30 | −30 | −33 | −51 | −36 |
| Brookfield Viscosity at −40° C. | [mPas] | 14500 | 12700 | 12300 | 9800 | 12300 | 9800 | — | — | 10900 | Solid |

TABLE 4

Lubricant Oil Formulation (Fixed VI)

| Lubricant Example | | Ex. 1 | Ex. 2 | Ex. 3 | Ex. 4 | Ex. 5 | Ex. 6 |
|---|---|---|---|---|---|---|---|
| Ex. 1 | [wt %] | 4.9 | | | | | |
| Ex. 2 | [wt %] | | 3.2 | | | | |
| Ex. 3 | [wt %] | | | 5.5 | | | |
| Ex. 4 | [wt %] | | | | 3.9 | | |
| Ex. 5 | [wt %] | | | | | 3.7 | |
| Ex. 6 | [wt %] | | | | | | 4.8 |
| Ex. 7 | [wt %] | | | | | | |
| Ex. 8 | [wt %] | | | | | | |
| Comp. Ex. 9 | [wt %] | | | | | | |
| Comp. Ex. 10 | [wt %] | | | | | | |
| Comp. Ex. 11 | [wt %] | | | | | | |
| Comp. Ex. 12 | [wt %] | | | | | | |
| Anglamol 99 | [wt %] | 6.5 | 6.5 | 6.5 | 6.5 | 6.5 | 6.5 |
| Nexbase 3030 | [wt %] | 44.5 | 34.0 | 51.0 | 45.0 | 38.8 | 43.7 |
| Nexbase 3043 | [wt %] | 44.1 | 56.3 | 37.0 | 44.6 | 51.0 | 45.0 |
| Formulation Results | | | | | | | |
| Viscosity at 100° C. | [cSt] | 26.1 | 26.2 | 26.0 | 26.1 | 25.9 | 26.0 |
| Viscosity at 40° C. | [cSt] | 5.6 | 5.5 | 5.5 | 5.6 | 5.5 | 5.5 |
| Viscosity Index | — | 160 | 157 | 160 | 160 | 156 | 157 |
| Traction coefficient 1 m/s, 20% SRR, 40° C. | — | 0.0463 | 0.0471 | 0.0478 | 0.0474 | 0.0490 | 0.0487 |
| Improvement in traction | [%] | 19% | 17% | 16% | 17% | 14% | 15% |

| Lubricant Example | | Ex. 7 | Ex. 8 | Comp Ex. 9 (*) | Comp Ex. 10 | Comp Ex. 11 | Comp Ex. 12 |
|---|---|---|---|---|---|---|---|
| Ex. 1 | [wt %] | | | | | | |
| Ex. 2 | [wt %] | | | | | | |
| Ex. 3 | [wt %] | | | | | | |
| Ex. 4 | [wt %] | | | | | | |
| Ex. 5 | [wt %] | | | | | | |
| Ex. 6 | [wt %] | | | | | | |
| Ex. 7 | [wt %] | 4.8 | | | | | |
| Ex. 8 | [wt %] | | 5.6 | | | | |
| Comp. Ex. 9 | [wt %] | | | 10.6 | | | |
| Comp. Ex. 10 | [wt %] | | | | 2.6 | | |
| Comp. Ex. 11 | [wt %] | | | | | 6.8 | |
| Comp. Ex. 12 | [wt %] | | | | | | 5.2 |
| Anglamol 99 | [wt %] | 6.5 | 6.5 | 6.5 | 6.5 | 6.5 | 6.5 |
| Nexbase 3030 | [wt %] | 41.1 | 41.9 | 31.9 | 43.9 | 42.3 | 50.0 |
| Nexbase 3043 | [wt %] | 47.0 | 46.0 | 51.0 | 47.0 | 44.4 | 38.3 |
| Formulation Results | | | | | | | |
| Viscosity at 100° C. | [cSt] | 26.0 | 25.9 | 26.4 | 25.8 | 25.9 | 26.0 |
| Viscosity at 40° C. | [cSt] | 5.6 | 5.5 | 5.6 | 5.6 | 5.5 | 5.5 |
| Viscosity Index | — | 160 | 158 | 158 | 163 | 158 | 158 |
| Traction coefficient 1 m/s, 20% SRR, 40° C. | — | 0.0489 | 0.0493 | 0.0570 | 0.0540 | 0.0523 | 0.0522 |
| Improvement in traction | [%] | 14% | 14% | 0% | 5% | 8% | 8% |

(*) The lubricant composition comprising Comparative Example 9 is the reference point for the evaluation of the traction improvement.

Lubricant Oil Formulation (Fixed VI)

As shown in Table 4 above, a second type of lubricant oil formulation was prepared and the traction coefficient of each formulation comprising the copolymers 1 to 8 according to the present invention, as well as comparative polymers 9 to 12, was measured. The lubricant oil formulations of Table 4 are all based on a mixture of group III base fluids (Nexbase 3030 and Nexbase 3043), a commercially available additive package and either one of the inventive copolymers or comparative examples.

For direct comparison of the individual lubricant oil compositions, the kinematic viscosity at 100° C. of each composition was adjusted to 5.5 cSt and the kinematic viscosity at 40° C. of each composition to 26.0 cSt.

For each composition, viscometric properties and the traction coefficient were determined (see Table 4 above). The lubricant composition comprising the PAMA additive shows the worse traction performance and thus was used as reference point to compare the different traction results of the other lubricant compositions.

As shown in Table 4 above, the traction coefficient for the inventive examples are superior in comparison to the comparative examples, which show the additional positive effect of using the lubricant additives according to the invention.

In conclusion, it has been demonstrated that the hydrogenated copolymers of the invention fulfill the requirements of the lubricant technical field, by having a lower treat rate which is always sought to avoid thickening of the lubricant formulations and lower the risk of incompatibilities with other components in the lubricant formulation. In addition, there is a clear positive effect on the traction properties of the lubricant formulations comprising the lubricant additives according to the present invention.

The invention claimed is:

1. A hydrogenated linear copolymer, obtainable by polymerizing a monomer composition, wherein the monomer composition consists of:
   a) at least 10 mol-% of 1,3-butadiene monomer;
   b) at least 40 mol-% of isoprene;
   c) 1 to 30 mol-% of one or more of $C_1$-$C_6$ alkyl(meth)acrylates; and
   d) 0 to 30 mol-% of one or more of $C_7$-$C_{24}$ alkyl(meth)acrylates;
   wherein mol percentages are based on the total amount of monomers in the monomer composition, and wherein:
       the total amount of monomers a) and b) sum up to at least 60 mol-% of the total amount of the monomer composition; and
       the hydrogenated copolymer has a weight-average molecular weight in the range of 2,000 g/mol-30,000 g/mol and a degree of hydrogenation of more than 95%; and
       the sum of the mol percentages of paragraphs a)-d) equal 100%.

2. The hydrogenated linear copolymer of claim 1, comprising a weight-average molecular weight of 3,000 g/mol-20,000 g/mol.

3. The hydrogenated linear copolymer of claim 1, wherein the hydrogenated copolymer has a weight-average molecular weight of 4,000 g/mol-18,000 g/mol.

4. The hydrogenated linear copolymer of claim 1, wherein the hydrogenated copolymer has a polydispersity index (PDI) of 1.0 to 4.0.

5. The hydrogenated linear copolymer of claim 1, wherein the hydrogenated copolymer has a PDI of 1.0-3.3.

6. The hydrogenated linear copolymer of claim 1, wherein the hydrogenated copolymer is a statistical or block copolymer.

7. The hydrogenated linear copolymer of claim 1, wherein the monomer composition consists of:
   a) at least 10 mol-% of 1,3-butadiene monomer;
   b) at least 40 mol-% of isoprene;
   c) 1 to 20 mol-% of one or more $C_1$-$C_6$ alkyl(meth)acrylates; and
   d) 5 to 20 mol-% of one or more $C_7$-$C_{24}$ alkyl(meth)acrylates;
   wherein mol percentages are based on the total amount of monomers in the monomer composition.

8. The hydrogenated linear copolymer of claim 1, wherein the one or more $C_1$ to $C_6$ alkyl (meth)acrylate monomers of paragraph c) are selected from the group consisting of: methyl (meth)acrylate; butyl (meth)acrylate; and a mixture thereof.

9. The hydrogenated linear copolymer of claim 1, wherein the one or more $C_7$ to $C_{24}$ alkyl (meth)acrylate monomers of paragraph d) are lauryl (meth)acrylates.

10. The hydrogenated linear copolymer of claim 9, comprising a weight-average molecular weight of 3,000 g/mol-20,000 g/mol.

11. The hydrogenated linear copolymer of claim 10, wherein the hydrogenated copolymer has a PDI of 1.0 to 4.0.

12. The hydrogenated linear copolymer of claim 11, wherein the hydrogenated copolymer is a statistical copolymer.

* * * * *